United States Patent [19]

Sturm

[11] Patent Number: 4,872,311

[45] Date of Patent: Oct. 10, 1989

[54] EXHAUST GAS TURBINE CONNECTED TO ENGINE OUTPUT

[76] Inventor: Michael Sturm, Klappengasse 55, 6707 Schifferstadt, Fed. Rep. of Germany

[21] Appl. No.: 196,160

[22] Filed: May 19, 1988

[51] Int. Cl.[4] .............................................. F02B 41/10
[52] U.S. Cl. ........................................ 60/615; 60/624
[58] Field of Search ................. 60/597, 598, 602, 614, 60/615, 624

[56] References Cited

U.S. PATENT DOCUMENTS

| | | | |
|---|---|---|---|
| 1,816,787 | 7/1931 | Moss | 60/602 |
| 2,369,175 | 2/1945 | Prince | 60/615 |
| 2,375,852 | 5/1945 | Kilchenmann | 60/624 X |
| 2,578,028 | 12/1951 | Udale | 60/624 X |
| 2,585,968 | 2/1952 | Schneider | 60/624 X |
| 2,607,189 | 8/1952 | Chilton | 60/624 X |
| 3,080,704 | 3/1963 | Nallinger | 60/624 |
| 4,356,695 | 11/1982 | Sumi et al. | 60/602 |
| 4,586,337 | 5/1986 | Fox | 60/624 X |
| 4,718,235 | 1/1988 | Kawamura | 60/624 X |

FOREIGN PATENT DOCUMENTS 485755  5/1938  United Kingdom .................. 60/624

Primary Examiner—Michael Koczo
Attorney, Agent, or Firm—Henderson & Sturm

[57] ABSTRACT

An internal combustion engine exhaust system is connected to a controlled manifold for selectively varying the manifold output to an exhaust gas driven turbine which is connected by a clutch to the engine output shaft. The control of the manifold includes selective delivery to a muffler. The clutch is of the hydraulic type. The engine includes a variable speed transmission having a control which is connected to the control of the manifold.

1 Claim, 5 Drawing Sheets

EXHAUST GAS TURBINE CONNECTED TO ENGINE OUTPUT

BACKGROUND AND SUMMARY OF THE INVENTION

The invention relates to a combustion engine with a turbine that can be driven by the exhaust gas of the combustion engine via an input which is connected with an output of the combustion chamber of the combustion engine and driving a shaft which supplies the combustion engine with driving energy by a transmission and a fluid coupling.

A combustion engine of the type referred to above has already become known (U.S. Pat. No. 2,585,968 to Schneider) whose combustion chamber is connected via exhaust pipes with a gas turbine which in turn transmits drive via a shaft and a transmission to the crankshaft of the combustion engine. In this way it is not possible to utilize the relatively high speed of the exhaust turbine in an optimum manner since the high speeds of the gas turbine would lead to overspeeding of the combustion engine, all the more so as the output speed of the gas turbine is passed directly to the crankshaft of the combustion engine.

In contrast to that, the present invention has the objective of supplying the combustion engine with the exhaust power of the turbine in a manner that avoids overspeeding of the combustion engine. Since the output of the turbine is passed to the output shaft of the combustion engine via a transmission and a fluid coupling, overspeeding of the combustion engine can be excluded. This is achieved advantageously by arranging a transmission gearing between the output shaft of the gas turbine and the output shaft of the combustion engine. To this end, the output gear of the transmission is advantageously connected with one half or the input part of a fluid coupling which via the fluid medium is in driving connection with the output part of the fluid coupling. The output part of the fluid coupling is firmly drive-connected with the output shaft of the combustion engine. It is also of advantage here that the fluid coupling is arranged behind the transmission of the combustion engine.

The exhaust gases from the combustion chamber of the engine are controlled via a control element consisting of a casing and a slide so that the exhaust gases are either passed directly to the gas turbine or, after adjusting the control element, to the exhaust.

DESCRIPTION OF THE DRAWINGS

In the following, the invention is described in detail on the basis of drawings illustrating only one possible embodiment of the invention.

DETAILED DESCRIPTION OF A PREFERRED EMBODIMENT OF THE INVENTION

Figure 1:
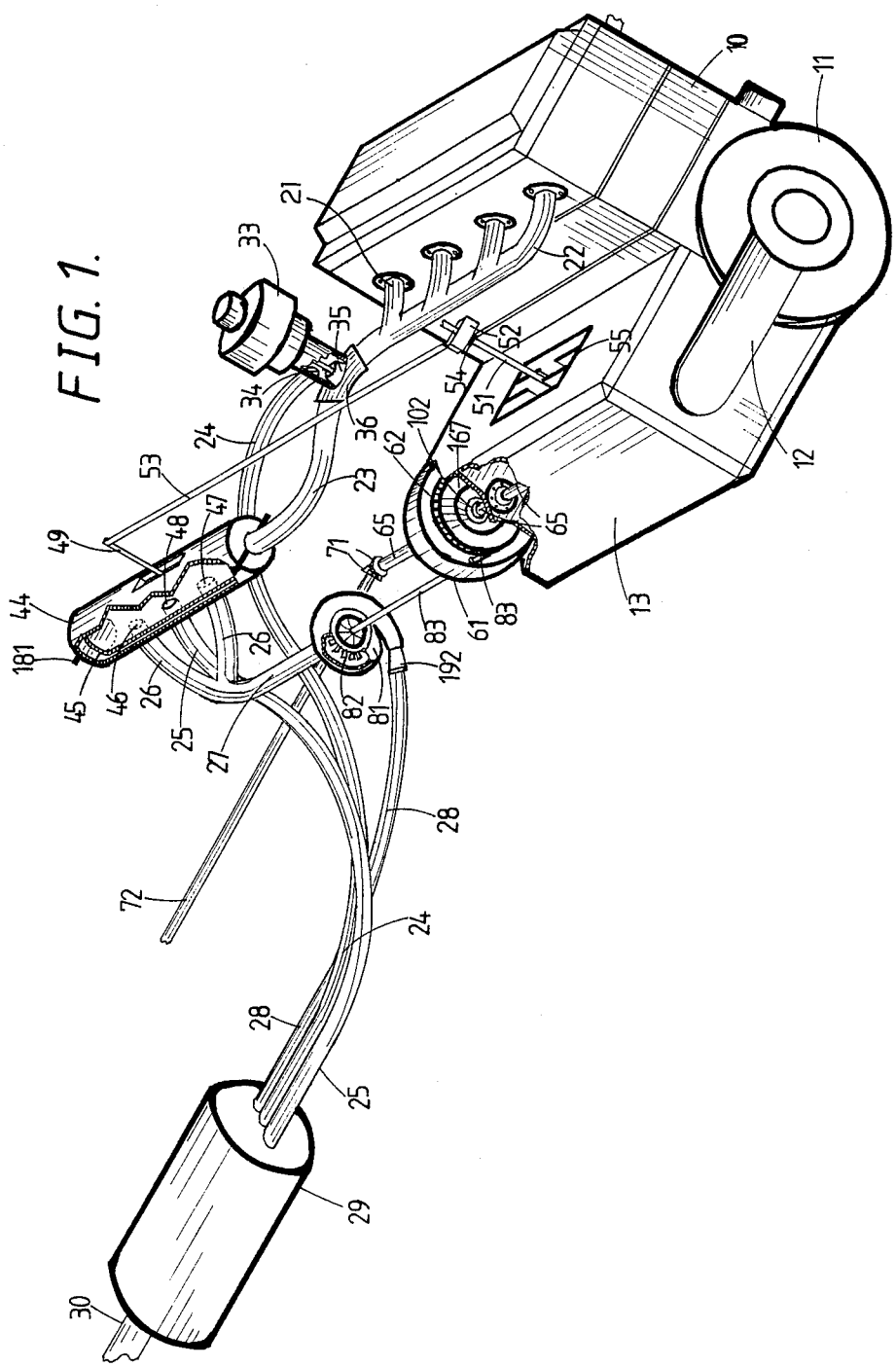
FIG. 1 is a perspective representation of the combustion engine with a gas turbine and a control element.

No. 10 in the drawing denotes a combustion engine which is drive-connected with a transmission 13 flanged to engine 10 via a coupling 11. The engine combustion chambers (not shown) are connected to a manifold 22 at the engine exhaust outlets 21, and the manifold is connected to the casing 39 of a control element 44 via an input pipe 23. The exhaust gases from the combustion engine can be passed via control element 44 and via outputs 46, 47 and 148 (FIG. 4) provided in casing 39 to the input pipe 27 of a turbine 81. For this purpose casing 39 has been provided with a slide 45 which has an opening 48 connecting the output opening 43 of the input pipe 23 either with the outputs 46 or 47 or 148.

Manifold 22 can further be connected with a valve piston 35 via a by-pass valve 33 to a by-pass pipe 24 which is connected to the exhaust casing or muffler 29 provided with an exhaust pipe 30.

Figure 4:
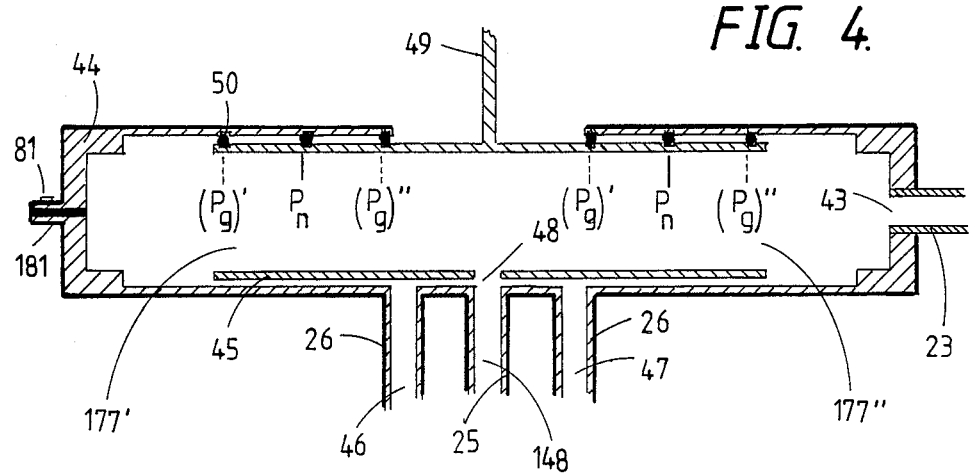
FIG. 4 shows a control element to control the exhaust gases of the combustion engine.
Figure 5:
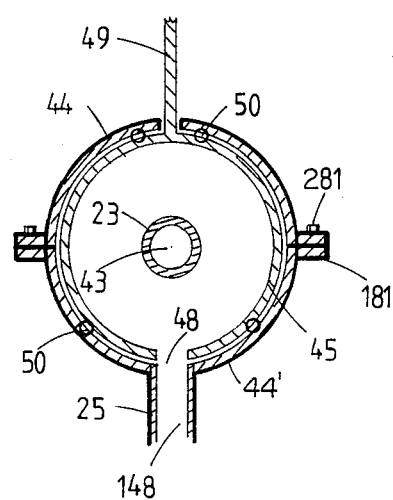
FIG. 5 depicts a cross section through the casing of the control element.
Figure 6:
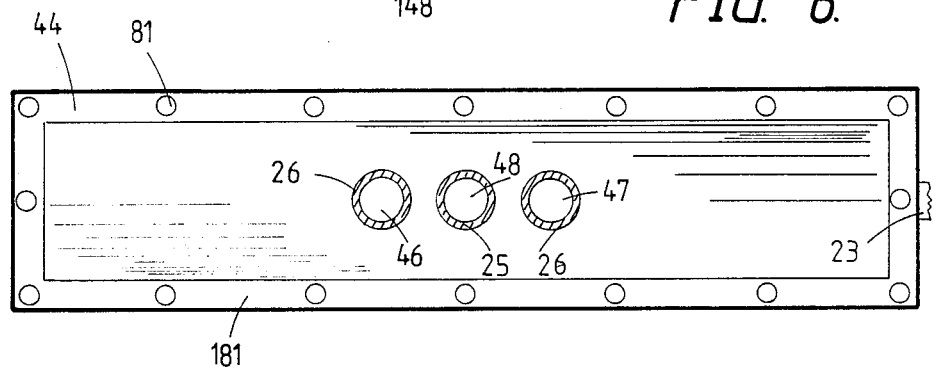
FIG. 6 illustrates one side of the casing of the control element with different outputs.
Figure 7:
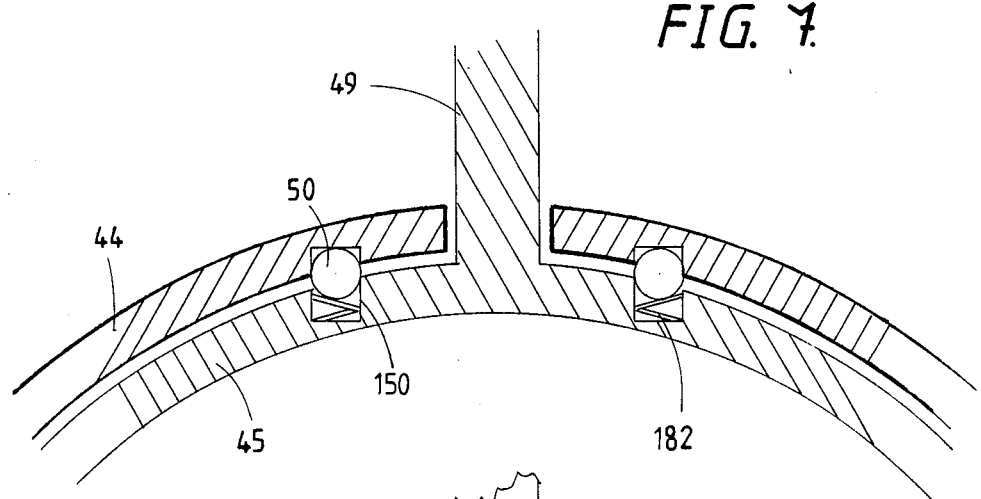
FIG. 7 is a section of part of FIG. 4.

As shown in FIG. 4, the opening 48 of slide 45 is connected to output 25 connected to the muffler 29. This position "g" corresponds to the neutral position.

Casing 39 shown in FIG. 4 consists of two parts 44 and 44' which are detachably connected by screw bolts 281. For this purpose two opposite flanges 181 are provided at the outer circumference of the casing parts 44 and 44', into which the screw bolts 281 are plugged.

As may be seen in FIG. 4, slide 45 shows an upright lever system 49 to which a control element 53 is connected which in turn is connected to a control lever 51 for adjusting slide 45 to the desired position in order to pass the exhaust gases either to the turbine 81 or to the muffler 29.

Figure 8:
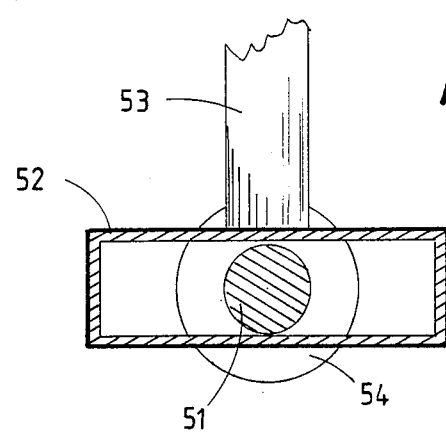
FIG. 8 shows a guide of a control lever for adjusting the slide of the control element.
Figure 9:
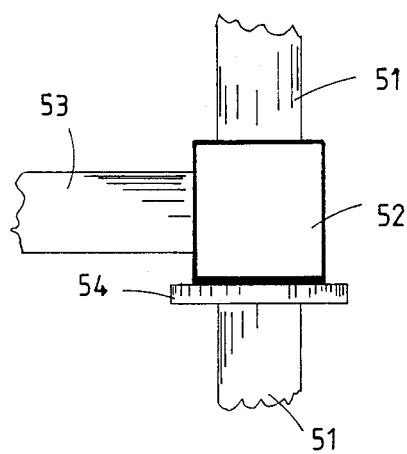
FIG. 9 is a top view according to FIG. 8.

As may be noted from FIG. 8, control lever 51 is located adjustably in a guide frame 52. Guide frame 52 is situated on a disk 54 in a freely movable position, disk 54 being firmly connected with the control lever 51. In this way a freely movable connection is obtained which makes it possible to engage the control lever 51 for adjusting transmission 13 in individual gear groups. For this purpose the control lever is situated in a guide 55 which serves for the adjustment of the individual shift positions of transmission 13. As becomes apparent from FIG. 2, turbine 81 drives a shaft 83 which leads to casing 193 which encloses a fluid coupling 61. Casing 193 is detachably connected to a wall 14 of transmission 13 via screw bolts 70. The inner end of shaft 83 bears a gear 93 which interacts with a gear 92 arranged at an output shaft 65 of the combustion engine 10. Gear 92 rotates freely on the shaft 65 and is detachably connected with and drives an input part 62 of the fluid coupling 61 via screw bolts. For this purpose the input part 62 can be journalled by means of roller bearing 99 on shaft 65. The output part 167 of the fluid coupling is arranged behind the input part 62 and is drive-connected with flange 102 firmly attached to shaft 65 by means of screw bolts 101. The arresting element 100 on shaft 65 between the input part 62 and the output part 167 ensures that the gap between the input part 62 and the output part 167 is maintained.

Figure 2:
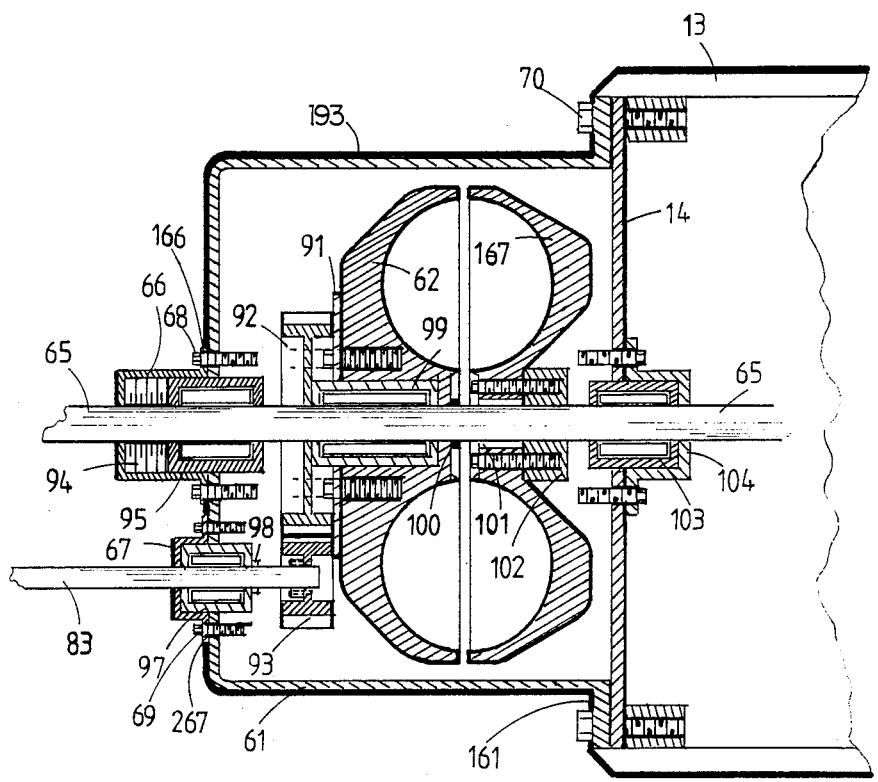
FIG. 2 shows a section of the drive elements between the gas turbine and the output shaft of the combustion engine.
Figure 3:
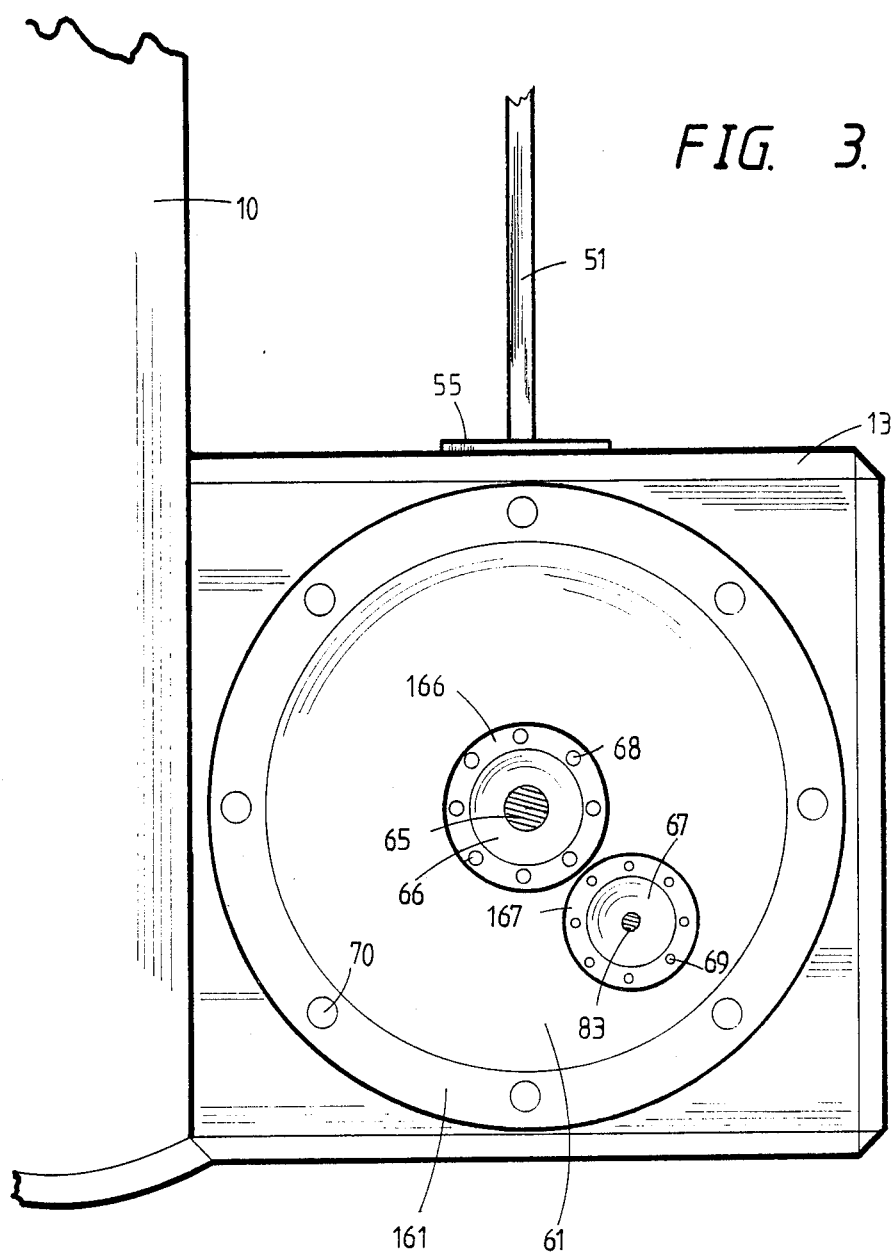
FIG. 3 is a reverse view of the part of the transmission with the output shaft of the combustion engine.

As FIG. 2 shows, the output shaft 65 is contained, on the one hand, in a cage 104 by means of a roller bearing 103, and the cage is firmly connected to the wall 14, and, on the other hand is journalled in the casing 193 by means of a roller bearing 95 in a bearing box 66 via screw bolts 68. Shaft 83 of turbine 81 can be pivoted in a bearing box 67 by means of a roller bearing 97, said bearing box 67 being firmly connected to the front side of coupling casing 193 by means of screw bolts 69.

As may be seen in FIG. 4, the slide 45 can be arrested in positions Pn P'g and P"g by means of the stopping element 50. The stopping element 50 is situated in slot 182 in one of the housing parts 44 into which it is pressed by means of a spring 195 which is arranged in slot 150 located in the housing part 45.

In principle, when shifting from one speed to another the control lever 51 ensures that the turbine is supplied with driving energy by the exhaust gases flowing from the engine chamber so that the energy supplied to turbine 81 is passed to the output shaft 65 via shaft 83 and the gears 92, 93 and the input part 62 as well as the output part 167. By the advantageous admission of the exhaust energy to the output shaft 65 of the combustion engine 10 the so-called body oscillation effect during shifting or acceleration is avoided. If, for example, the coupling is engaged and the transmission 13 disengaged from the combustion engine, the exhaust energy continues to be passed to the transmission and gear wheels 92, 93 as well as the input part 62 and the output part 167 to the output shaft 65 via the turbine 81, so that a drive connection between turbine 81 and the output shaft 65 is maintained during shifting. This enables a much more uniform or more continuous acceleration for the motor vehicle. This drive system in addition results in distinctly increased acceleration values, a markedly improved final speed and a drastically reduced fuel consumption.

I claim:

1. Motor combustion engine having a turbo compound system for improving the performance of the engine, comprising: casing means for receiving engine exhaust gases and having a plurality of outlets for discharging the exhaust gases, an exhaust-gas-driven turbine means having an inlet connected to certain of the casing means outlets, said turbine means having a driving shaft, an output shaft, variable-speed transmission means connecting the output shaft to be driven by the engine and including a control, a hydraulic clutch having a first part idling on the output shaft and a second part fixed to the output shaft, gear means drivingly connecting the turbine means driving shaft to the first part of the hydraulic clutch, by-pass means connected to other of the casing means outlets, and control means for selectively opening and closing the casing outlets to vary the transmission of exhaust gases to the turbine means, said control means for the casing means being connected to the control for the transmission means.

* * * * *